United States Patent [19]
Rodriguez et al.

[11] Patent Number: 5,528,599
[45] Date of Patent: Jun. 18, 1996

[54] METHOD AND APPARATUS OF COMBINING SIGNALS IN A DIGITAL PIPELINED SIGNAL ADDER

[75] Inventors: David R. Rodriguez; William Walsh, both of Chicago; Gary M. Segal, Palatine, all of Ill.

[73] Assignee: Motorola, Inc., Schaumburg, Ill.

[21] Appl. No.: 114,722

[22] Filed: Aug. 30, 1993

[51] Int. Cl.[6] ............................................ G06F 11/00
[52] U.S. Cl. ...................... 371/20.1; 371/37.2; 371/37.7
[58] Field of Search ............................ 371/20.1, 8.2, 371/37.2, 37.7, 38.1, 39.1, 44, 45; 395/183.19, 185.09; 375/224, 228; 370/16

[56] References Cited

U.S. PATENT DOCUMENTS

| | | | |
|---|---|---|---|
| 4,017,828 | 4/1977 | Watanabe et al. | 371/8.2 |
| 4,365,248 | 12/1982 | Bargeton et al. | 371/8.2 |
| 4,680,776 | 7/1987 | Ikeuchi et al. | 371/8 |
| 4,716,566 | 12/1987 | Masuhara et al. | 371/38 |
| 4,894,827 | 1/1990 | Ramsay et al. | 371/8.2 |
| 5,285,441 | 2/1994 | Banset et al. | 370/6 |
| 5,424,969 | 6/1995 | Yamada et al. | 364/750.5 |

OTHER PUBLICATIONS

Computer System Architecture, M. Moris Mano, Prentice Hall, Inc. 1982, pp. 217–219.

Primary Examiner—Robert W. Beausoliel, Jr.
Assistant Examiner—Trinh L. Tu
Attorney, Agent, or Firm—Jeffrey G. Toler

[57] ABSTRACT

A method and apparatus is provided for combining a plurality of signals in a digital pipelined signal adder. The method includes the steps of receiving (100) an upstream primary signal in a combiner and error checking 101 the primary signal in the combiner. When the primary signal passes error checking the primary signal is selected (103) and when the primary signal fails error checking a redundant signal is selected (102). The method further includes adding (104) the selected signal and a local input of the plurality of signals within the combiner to produce a downstream primary signal.

13 Claims, 3 Drawing Sheets

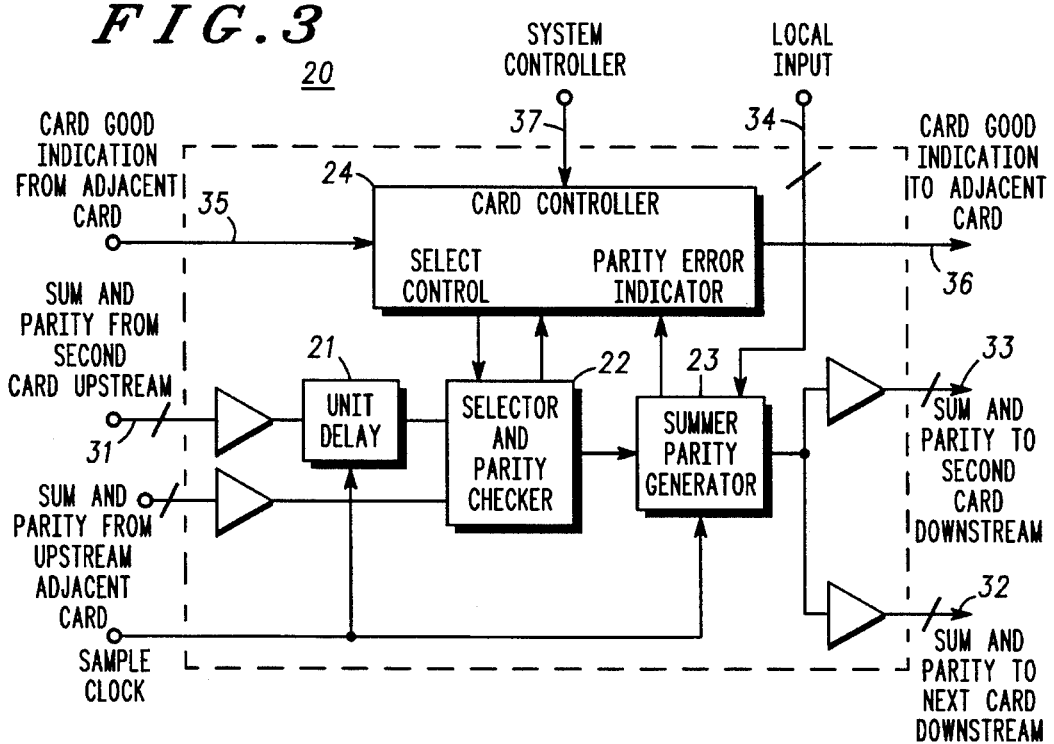
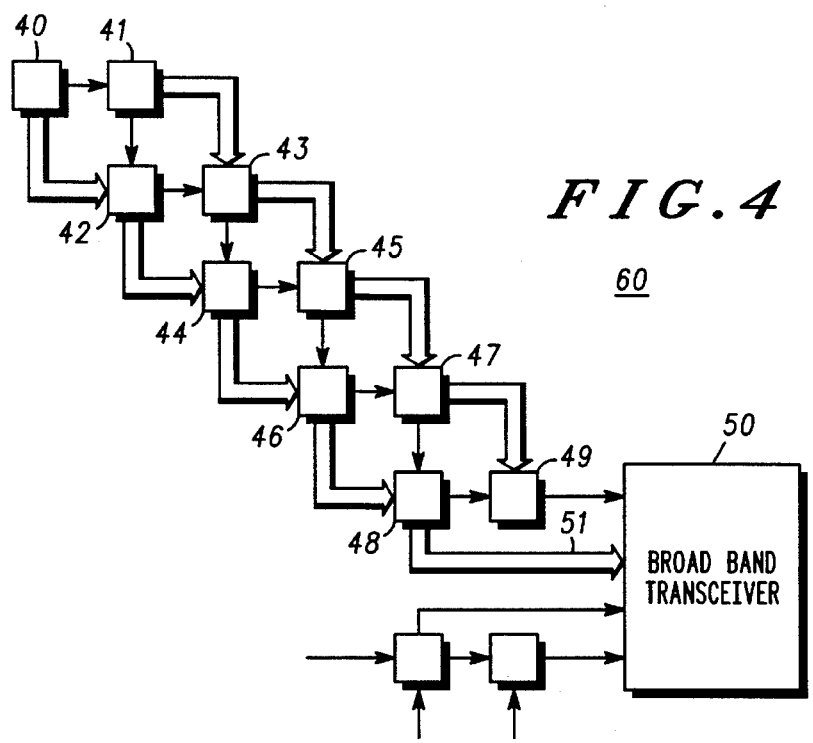

METHOD AND APPARATUS OF COMBINING SIGNALS IN A DIGITAL PIPELINED SIGNAL ADDER

FIELD OF THE INVENTION

The field of the invention relates to communication systems and in particular to pipelined signal adders.

BACKGROUND OF THE INVENTION

Cellular communication systems using spread spectrum encoding are known. Direct sequence (DS) and frequency hopping are the two most well known of the code division multiple access (CDMA) spread spectrum technologies in which an information signal is distributed over a relatively wide spectral area for purposes of reducing the impact of interference. Frequency hopping achieves the benefits of spread spectrum transmission by hopping through a number of conventional narrowband channels, thereby reducing the average impact of interference in any one channel or group of channels.

DS-CDMA spreads an information signal over a designated spectrum by modulating the information signal with a spreading code having properties which ideally would be random in nature. The spreading code actually used, on the other hand, is typically the output of a pseudorandom number generator which provides a number sequence that repeats over a relatively long time interval.

At a receiver the DS spread spectrum signal must be de-spread through use of a de-spreading code that has the same characteristics as the spreading signal. De-spreading is accomplished by the correlation of the received spread signal with a synchronized replica of the spreading code.

The use of a spreading code that has the characteristics of a random signal (and a random distribution of included frequencies) ensures that the transmitted signal with be randomly spread throughout a transmission spectrum. The random distribution of frequencies is ensured by the random nature of the signal itself and the fact that an interaction of a relatively large number of frequencies is necessary to cause the random path followed by a random signal.

The requirement for a duplicate of the spreading signal at a receiver (for de-spreading) requires that the spreading (and de-spreading) code be a repeating sequence known to both transmitter and receiver. The use of identical spreading and de-spreading codes at both transmitter and receiver provides the basis for communication between multiple pairs of communicating parties within the same spectrum under the DS-CDMA format.

Service for DS-CDMA communication units is typically provided through a base transceiver station (BTS) providing communication service within an associated geographical area. Since a number of communiction units may require simultaneous service within the geographic area, the BTS must be capable of simultaneously transceiving numerous CDMA signals. While a number of CDMA transceivers and antenna could be located at the BTS to service the signals, such an approach would be prohibitively expensive. A more economical approach has been to transceive the signals through a single antenna using transceivers suited for such use.

To accomplish the task of transceiving multiple CDMA signals through a common antenna, an output of each active CDMA channel is typically combined before power amplification. Power amplification of the multitude of signals transmitted through the common antenna is accomplished through the use of a linear power amplifier (LPA).

The prior art has taught that one method of combining CDMA signals is by, first, converting each digital CDMA signal sample into its analog equivalent and, then, combining the multitude of signals within a resistive array. While such an approach is effective, it is difficult to implement in a CDMA system. One problem relates to synchronization of a number of CDMA signals to a common reference. The communications regulatory body on CDMA (Electronic Industry Association/Telecommunications Industry Association (EIA/TIA) standards Interim Standard (IS)95) has mandated that each CDMA signal of the multitude of signals transmitted by a BTS shall be synchronized to within plus or minus 50 ns of a pilot signal for each channel. Conversion of CDMA signals to an analog format and summing within a resistive array introduces indeterminant time delays which are inconsistent with the EIA/TIA standards and the need for precise synchronization among CDMA signals.

Another problem inherent in the use of a resistive array for combining CDMA signals lies in the difficulty in troubleshooting such a system. Where a problem occurs, a resistive array allows signals to travel both upstream and downstream within the array making it difficult to isolate individual signals for analysis.

While the prior art use of resistive arrays combining techniques has proven effective in some applications, such use is expensive and often difficult to implement where synchronization requirements are precise. A need exists for a method of combining CDMA signals that facilitates synchronization among the combined signals, channel maintenance and failure analysis.

BRIEF DESCRIPTION OF THE DRAWINGS

FIG. 3 is a block diagram of an adder in accordance with the invention.

FIG. 4 is a block diagram of a ten channel adder in accordance with the invention.

DETAILED DESCRIPTION OF THE PREFERRED EMBODIMENT

The solution to the problem of providing a method of combining CDMA signals that facilitates synchronization among the combined signals, channel maintenance and failure analysis lies, conceptually, in digitally adding the CDMA signals in a pipelined adder immediately after encoding and before conversion to an analog format. Such an approach allows an absolute value of each CDMA signal sample to be summed with values of other CDMA signals while maintaining very close synchronization tolerances. The use of redundant signal paths through the pipelined adder also improves reliability by allowing the pipelined adder to function with one or more failed (or removed) channel cards.

Figure 5:
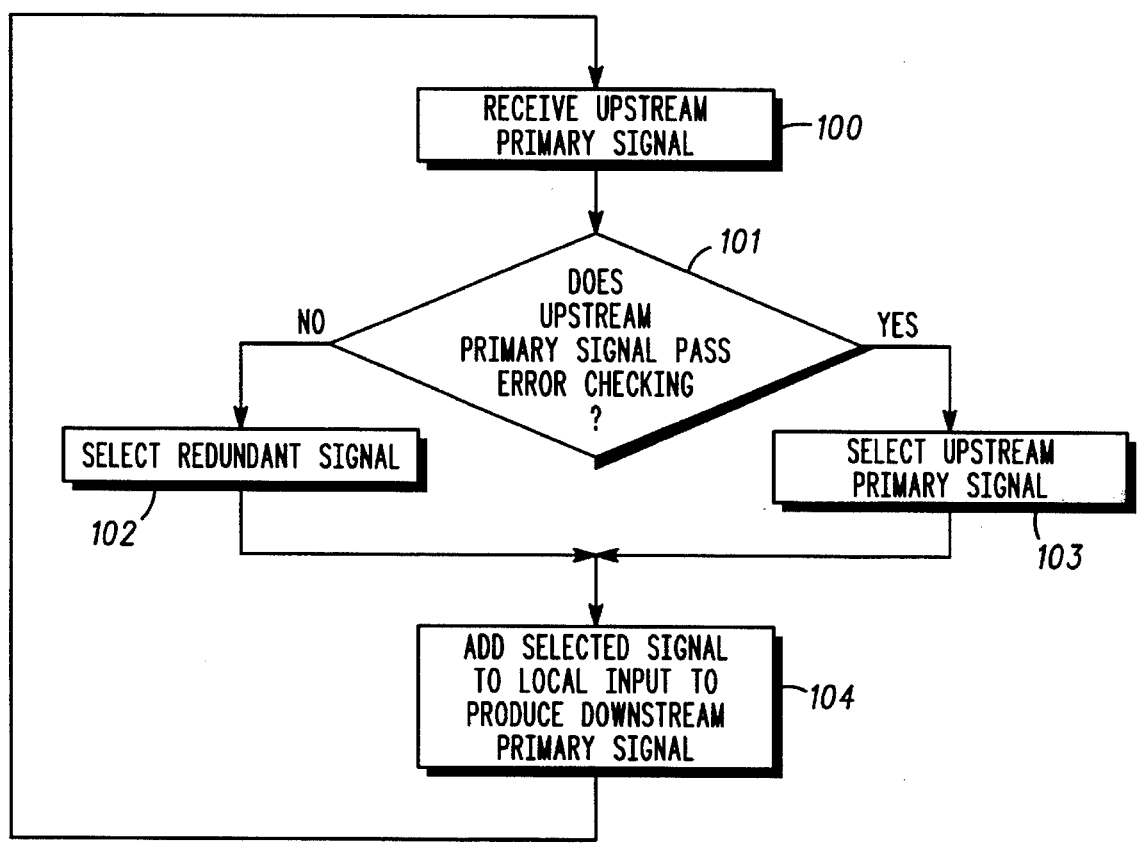
FIG. 5 is a flow chart of pipelined adder operation in accordance with the invention.

FIG. 5 is a flow chart of pipelined adder operation in accordance with an embodiment of the invention. Reference shall be made to FIG. 5 as appropriate to an understanding of the invention.

Figure 1:
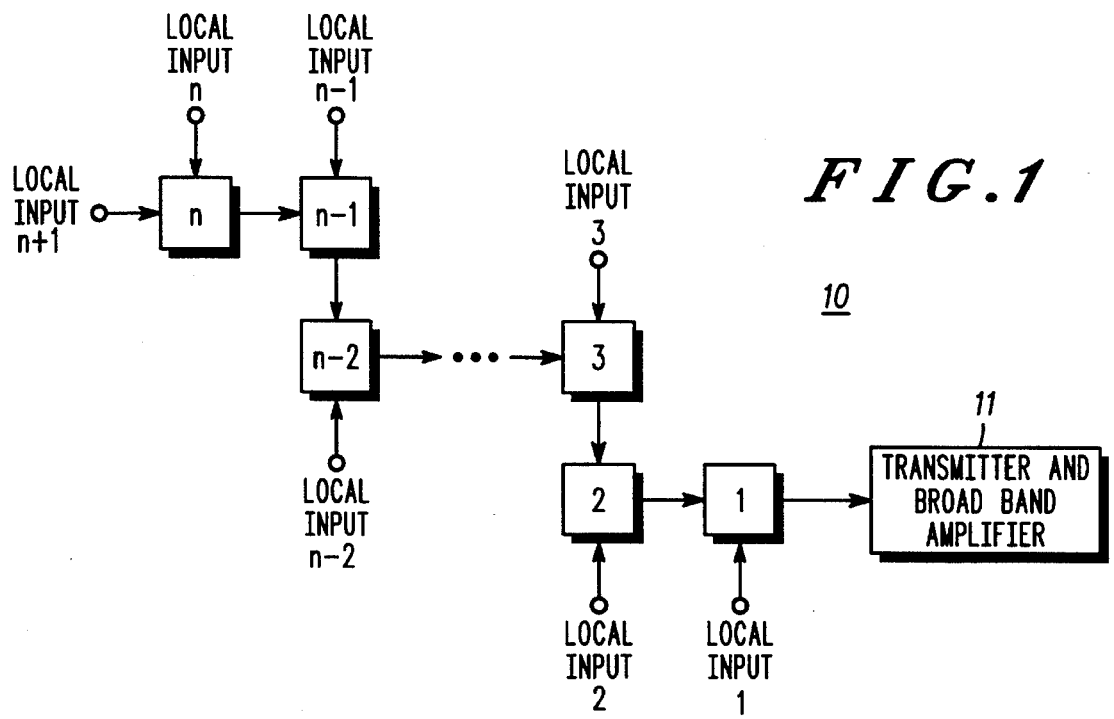
FIG. 1 is a simplified block diagram of a pipelined adder in accordance with the invention.

FIG. 1 depicts a simplified pipelined adder 10 of an n-channel CDMA combiner in accordance with an embodiment of the invention. Within the simplified pipelined adder 10, n+1 local CDMA inputs are summed along a primary signal path before application to a transmitter and amplification within a broad band amplifier 11. Within the simplified pipelined adder 10 a first local input n+1 and a second local input n are added during a first clock cycle within a first combiner n. Within a second combiner n−1 a third local input n−1 is added to the output of the first combiner n during a second clock cycle. During the n-th clock cycle a local input 1 is added to the output of combiner 2 within combiner 1 and the sum of all the local inputs, 1 through n, provided at the output of the combiner 1 is applied as an input to the broad band amplifier.

As the time it takes for the sum to reach the broadband amplifier 11 will be different from the point where each local input, 1 through n, is added to the advancing sum, the local inputs, 1 through n, presented to the combiners 1–n must be advanced in time based on the position of the combiner in the pipelined adder 10. Advancing the time of input of the local inputs, 1 through n, may be accomplished by one of two methods. Under the first method all CDMA signals are synchronized to every other clock signal provided by a global positioning system (GPS). The digital transmit signal synthesizer hardware operates with an advance relative to this clock signal. In operation, the synthesizer requests channel data earlier in time based upon the needed advance. In turn, the system element responsible for producing the data (such as a voice coder) advances its frame to provide the data.

Under a second method (and if the channel hardware doesn't support the timing advance of method 1) then a variable size first-in-first-out (FIFO) buffer is added between the synthesizer output and the combiner 1–n. The size of the buffer is increased the closer the combiner, 1–n, is to the end of the chain (broadband amplifier 11)

Figure 2:
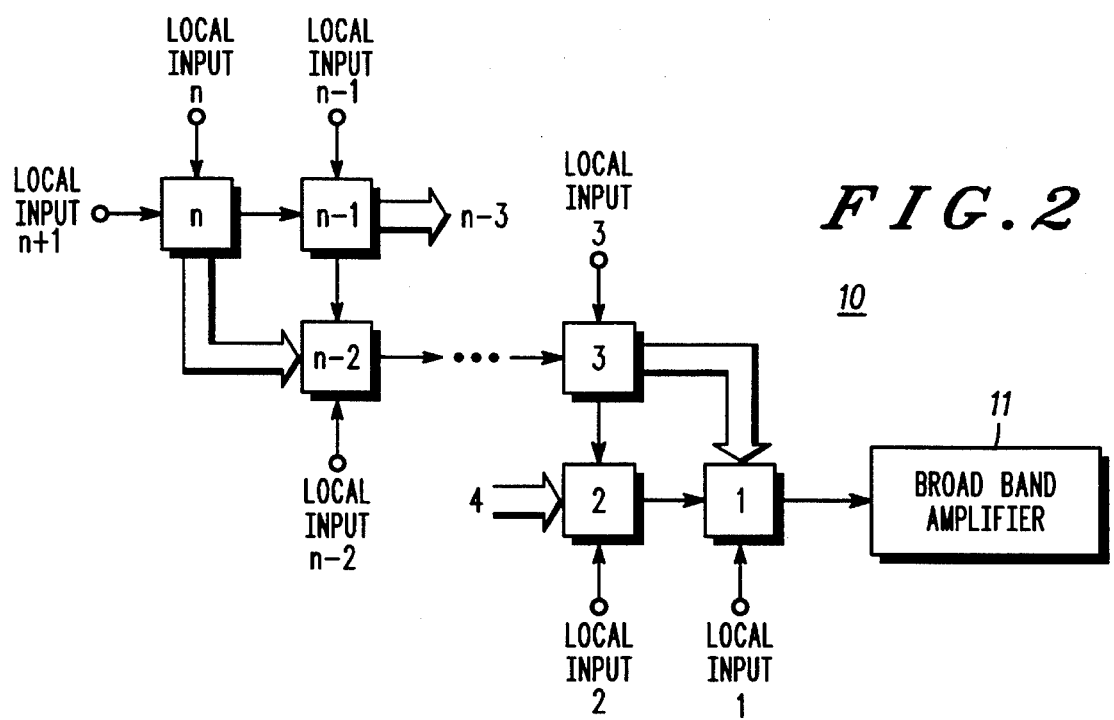
FIG. 2 is a simplified block diagram of a pipelined adder with a redundant signal path in accordance with the invention.

FIG. 2 depicts a more detailed pipelined adder 10 in accordance with an embodiment of the invention. Shown in FIG. 2 is a secondary (redundant) signal path (depicted in FIG. 2 through the use of doubled-lined arrows) providing fault tolerance to accommodate the failure of individual combiners 1–n.

Under an embodiment of the invention a parity check bit is included within the output of each combiner 1–n. The parity check bit is used for error checking 101 the output of each combiner 1–n within a downstream combiner 1–n of the pipelined adder 10. Where error checking by a combiner determines that the output of an upstream has failed, the error checking combiner selects 102 the redundant signal as an input, bypassing the combiner immediately upstream of the error checking combiner. Where error checking 101 determines that the output of the upstream combiner passes error checking, then the output of the upstream combiner is selected 103 as an input.

FIG. 3 is a more detailed view of a combiner 20 representative of combiners 1 through n. Within a combiner 20 an input of the primary signal path 30 is applied to a selector and parity checker 22 and summer and parity generator 23. Upon the completion of error checking within the parity checker 22, an indication of the status of error checking is forwarded to a card controller 24. When the sample on the primary signal path 30 fails error checking, the card controller 24 selects the redundant signal 31 from the redundant sample path by activation of a selector switch 22. When the sample on the primary signal path 30 passes error checking the primary signal path is selected by the selector switch 22.

To insure that synchronization of the adding sequence is maintained within the pipelined adder 10 a unit delay 21 is provided within the signal path of the redundant signal 31. The unit delay 21 may be comprised of a two-position first-in-first-out shift register. The unit delay 21 is necessary because a signal arriving on the redundant signal path 31 bypasses an intermediate combiner arriving one clock cycle ahead of the corresponding signal arriving via the primary signal path. The combiner accommodates the time difference by storing a redundant signal sample within the unit delay for possible use during the next clock cycle.

By way of example FIG. 4 is a ten channel CDMA pipelined adder 60 in accordance with an embodiment of the invention. Each combiner 40–49 is a functional equivalent of the combiner 20 of FIG. 3 (and as shown in simplified form in FIGS. 1 and 2). As under previous convention the single line arrows are representative of the primary signal path and double line arrows are representative of redundant signal paths.

It should be noted that a redundant signal path 51 is provided between the second to the last combiner 48 and the broad band amplifier 50. The redundant signal path 51 is provided in the event that the last combiner 49 should fail and requires that the broad band amplifier 50 also contain provisions (e.g., unit delay, selector switch, controller, etc.) for recognizing upstream card failure of the last combiner 48.

Within the pipelined signal adder 60 a first and a second local signal are combined within the first combiner 40. The sum of the first and second signal is output, after a first clock period, (along with a parity check) on the primary signal path to the second combiner 41. One of the first and second signals are forwarded on the redundant signal path to the second downstream combiner 42 as a means of salvaging at least one signal should the first combiner 40 fail.

Within the second combiner 41 error checking is performed on the output signal of the first combiner 40. If the output signal of the first combiner 40 passes error checking the primary signal path is chosen as an input for addition with a third local input within the second combiner 41 during a second clock period. If the output of the first combiner 40 fails error checking the redundant signal path is chosen for addition with the third local input within the second combiner 41 during the second clock period.

In a similar manner error checking and adding occurs within the remaining combiners 42–49. Upon application of the output of the final combiner 49 to the broad band amplifier 50, the broad band amplifer 50 determines whether to use the primary signal path or redundant signal path as a input. As above if the output of the final combiner 49 passes error checking then the primary signal path is chosen. If not, then the redundant signal path is chosen.

In another embodiment of the invention each channel card containing a combiner 20 conducts a self-check. If the card 20 passes the self-check then the card 20 provides a "card good" output 36 to the next downstream card. The next downstream card 20 uses the "card good" as another indicia for selecting the primary or redundant signal path.

In another embodiment, a signal 37 from a system controller may be used for selection of the first or redundant signal path. The system controller may instruct a channel card 20 to use the redundant signal path under conditions where the system controller detects a card malfunction or where the local channel (to be used as an input to the combiner) is unused.

The use of the pipelined adder 60 provides precise synchronization during channel summation consistent with the EIA/TIA standard IS-95 while still providing tolerance for card malfunction. Where a card fails or is removed from the system 60 the absence of a "card good" output 36 provides an indication for the next card, downstream, to select the redundant signal path. The facility for system control of channel operation through use of a system input 35 allows for individual channels or blocks of channels to be removed from service to accomodate changing operating conditions.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., application of the pipelined adder to TDMA systems), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. A method of combining a plurality of signals in a digital pipelined signal combiner, the method comprising the steps of: adding a first and a second signal in a first combiner to produce a first combiner output; providing as inputs to a second combiner the first combiner output and a third signal substantially similar to one of the first and second signals; error checking the first combiner output; when the first combiner output passes error checking, selecting the first combiner output; when the first combiner output fails error checking, selecting the third signal; and adding within the second combiner the selected signal and a local input signal.

2. The method as in claim 1 further including the step of delaying the third signal before adding within the second combiner.

3. The method as in claim 2 wherein the step of delaying the third signal further includes the step of buffering the third signal in a first-in-first-out buffer.

4. The method as in claim 1 further including the step of selecting one of the first, second, and third signals when a fault is detected in the first combiner.

5. The method of claim 1, wherein the third signal is a redundant signal.

6. The method of claim 1, wherein an output of second combiner is input to an amplifier.

7. An apparatus for combining a plurality of signals in a digital pipelined signal adder, such apparatus comprising: means for adding a first local input of the plurality of signals and a pipelined signal in a first combiner to produce a first combiner output signal; means for error checking the first combiner output signal in a second combiner; means for selecting the first combiner output when the first combiner output passes error checking; means for selecting a redundant signal when the first combiner output fails error checking; and means for adding within the second combiner the selected signal and a second local input of the plurality of signals to produce a second combiner output.

8. The apparatus as in claim 7 further comprising means for delaying the redundant signal before adding within the second combiner.

9. The apparatus as in claim 8 further comprising means for buffering at least one of the local input signals.

10. The apparatus as in claim 7 further comprising an at least third combiner operably coupled with the second combiner for receiving the second combiner output and a second redundant signal; an error detector within the at least third combiner for detecting errors in the second combiner output; a data selector for selecting the second redundant signal when an error is detector in the second combiner output and, otherwise, selecting the second combine output; an adder within the at least third combiner for adding the selected signal from the data selector to an at least third input of the plurality of signals to produce an at least third combiner output.

11. The apparatus of claim 7, further comprising a broadband amplifier coupled to one of the first and second combiners.

12. The apparatus of claim 7, wherein the second combiner further comprises a delay unit.

13. An apparatus for combining a plurality of signals in a digital pipelined signal adder, such apparatus comprising:

a first combiner adding a first local input of the plurality of signals and a pipelined signal to produce a first combiner output signal; and a second combiner including an error checking module receiving the first combiner output signal, a selector selecting the first combiner output when the first combiner output passes error checking and selecting a redundant signal when the first combiner output fails error checking, and a summing device adding the selected signal and a second local input of the plurality of signals to produce a second combiner output.

* * * * *

UNITED STATES PATENT AND TRADEMARK OFFICE
CERTIFICATE OF CORRECTION

PATENT NO. : 5,528,599
DATED : 06/18/1996
INVENTOR(S) : Rodriguez et al.

It is certified that error appears in the above-indentified patent and that said Letters Patent is hereby corrected as shown below:

At column 6, line 27, "detector" should be --detected--.

Signed and Sealed this

Twenty-fourth Day of September, 1996

*Attest:*

BRUCE LEHMAN

*Attesting Officer*  *Commissioner of Patents and Trademarks*